(12) United States Patent
Kim et al.

(10) Patent No.: US 7,975,790 B2
(45) Date of Patent: Jul. 12, 2011

(54) WHEEL DRIVING ASSEMBLY OF A MOVING APPARATUS

(75) Inventors: Myeong-ho Kim, Gwangju (KR); Sam-jong Jeung, Gwangju (KR); Jeong-gon Song, Gwangju (KR); Il-du Jung, Gwangju (KR); Ju-sang Lee, Gwangju (KR); Heung-yi Kim, Gwangju (KR); Sam-hyun Choi, Gwangju (KR); Jang-youn Ko, Gwangju (KR); Kyoung-woung Kim, Gwangju (KR); Dae-hyung Kim, Gwangju (KR); Hak-bong Lee, Gwangju (KR); Yoon-kyung Cho, Jeollabuk-do (KR)

(73) Assignee: Samsung Gwangju Electronics Co., Ltd., Gwangju (KR)

(*) Notice: Subject to any disclaimer, the term of this patent is extended or adjusted under 35 U.S.C. 154(b) by 566 days.

(21) Appl. No.: 12/152,781

(22) Filed: May 16, 2008

(65) Prior Publication Data

US 2009/0071732 A1 Mar. 19, 2009

(30) Foreign Application Priority Data

Sep. 14, 2007 (KR) .................. 10-2007-0093889

(51) Int. Cl.
*B60K 1/00* (2006.01)
*B62D 25/16* (2006.01)

(52) U.S. Cl. .............. 180/65.51; 280/156; 280/157; 280/79.4; 180/65.6

(58) Field of Classification Search .......... 180/65.51, 180/65.6; 280/156, 157, 152.05, 79.4, 124.1
See application file for complete search history.

(56) References Cited

U.S. PATENT DOCUMENTS

| | | | | |
|---|---|---|---|---|
| 3,380,546 A * | 4/1968 | Rabjohn | ........... | 180/15 |
| 5,036,941 A * | 8/1991 | Denzin et al. | ........... | 180/252 |
| 6,095,268 A * | 8/2000 | Jones, Jr. | ........... | 180/6.5 |
| 6,446,993 B1 * | 9/2002 | Huszarik et al. | ........... | 280/124.177 |
| 6,481,518 B1 * | 11/2002 | Wu | ........... | 180/65.6 |
| 6,698,313 B2 * | 3/2004 | Gaffney et al. | ........... | 74/665 N |
| 6,708,791 B2 * | 3/2004 | Alexander | ........... | 180/182 |
| 6,712,369 B2 * | 3/2004 | Wu | ........... | 280/5.2 |
| 7,556,111 B2 * | 7/2009 | Oshidari | ........... | 180/65.51 |
| 7,770,677 B2 * | 8/2010 | Takenaka | ........... | 180/65.51 |
| 2004/0262060 A1 * | 12/2004 | Kim | ........... | 180/65.5 |
| 2006/0180366 A1 * | 8/2006 | Brill et al. | ........... | 180/65.6 |
| 2007/0119635 A1 * | 5/2007 | Lee et al. | ........... | 180/22 |

* cited by examiner

*Primary Examiner* — Hau V Phan
*Assistant Examiner* — John R Olszewski
(74) *Attorney, Agent, or Firm* — Ohlandt, Greeley, Ruggiero & Perle, LLP

(57) ABSTRACT

A wheel driving apparatus for a moving apparatus is provided. The wheel driving apparatus includes a wheel, a driving motor to generate a driving power to rotate the wheel, a gear box to transmit the rotational force of the driving motor to the wheel, and a guide shaft movable vertically with respect to the base member, wherein the wheel, the driving motor, the gear box, and the guide shaft are connected integrally with each other to move vertically with respect to the base member in unison.

7 Claims, 5 Drawing Sheets

WHEEL DRIVING ASSEMBLY OF A MOVING APPARATUS

CROSS-REFERENCE TO RELATED APPLICATION

This application claims priority under 35 USC §119 from Korean Patent Application No. 2007-0093889, filed Sep. 14, 2007 in the Korean Intellectual Property Office, the entire disclosure of which is hereby incorporated by reference.

BACKGROUND OF THE INVENTION

1. Field of the Invention

The present disclosure relates to a wheel driving assembly, and more particularly, to a wheel driving assembly of a moving apparatus wherein the moving apparatus includes an automatically moving apparatus such as a robot cleaner, or other moving apparatus traveling according to external control.

2. Description of the Related Art

A moving apparatus such as an industrial movable robot or domestic robot cleaner includes a wheel, and a driving motor employed as a power source to transmit rotational force to the wheel. The wheel keeps the moving apparatus running by rotation, and a user controls the moving direction of the apparatus by controlling the wheel's direction of rotation.

It is important to lessen impacts or vibrations exerted on the wheel when the moving apparatus travels over a bumpy area or hits an obstacle such as a doorsill.

International Publication No. WO 02/067744 discloses an autonomous cleaner which includes a wheel arrangement. However, the wheel arrangement has some drawbacks in that a guide shaft is fastened to the body of a robot cleaner, a spring support member is separately disposed on a side of the guide shaft inside the body of the robot cleaner, and the guide shaft is fastened to the spring support member using screws. Therefore, the disclosed autonomous cleaner of WO 02/067744 has a complicated structure and causes inconvenience when assembling the wheel arrangement in the robot cleaner body.

Korean Patent Publication No. 2004-0096253 also discloses a wheel driving apparatus, which has the structure in which a wheel and a gear box rotate around a box support. The disclosed wheel driving apparatus of KR 2004-0096253 has a complicated structure in which a separate guide shaft is required and is connected by a spring, and also requires a wider space for the rotation of the wheel.

SUMMARY OF THE INVENTION

Exemplary embodiments of the present disclosure overcome the above disadvantages and other disadvantages not described above. Accordingly, it is an object of the present disclosure to provide a wheel driving assembly of a moving apparatus of an improved structure, which has a simplified structure, improved assemblability, and reduced width of wheel movement and so requires smaller space.

According to an aspect of the present disclosure, a wheel driving apparatus of a moving apparatus is provided, which includes a wheel, a driving motor to generate a driving power to rotate the wheel, a gear box to transmit the rotational force of the driving motor to the wheel, and a guide shaft movable vertically with respect to the base member. The wheel, the driving motor, the gear box, and the guide shaft may be connected integrally with each other to move vertically with respect to the base member in unison.

The wheel driving apparatus may further include a spring member to elastically support the wheel, the driving motor, the gear box, and the guide shaft when these elements are moved in unison.

The supporting member, the guide shaft, and the gear box may together form a module which is vertically movable.

The wheel driving apparatus may further include a sliding protrusion protruding from one side of the gear box to move vertically, and a guide slot to guide the movement of the sliding protrusion.

A first end of the guide shaft may be supported by the base member and a second end of the guide shaft may be supported on a wheel cover connected to the base member.

The wheel cover may be removably formed on an upper portion of the base member.

The gear box may include a support member extending from a portion thereof to move along the guide shaft, and the spring member is disposed between the support member and the wheel cover.

The wheel driving apparatus may further include a touch member extending from one side of the gear box to change a position according to ascending and descending movement of the gear box, and a switch disposed on the base member to correspond to the touch member, so that the driving motor stops operating when the touch member is brought into contact with the switch.

BRIEF DESCRIPTION OF THE DRAWINGS

The above and other aspects of the present disclosure will be more apparent from the following detailed description of exemplary embodiments with reference to the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
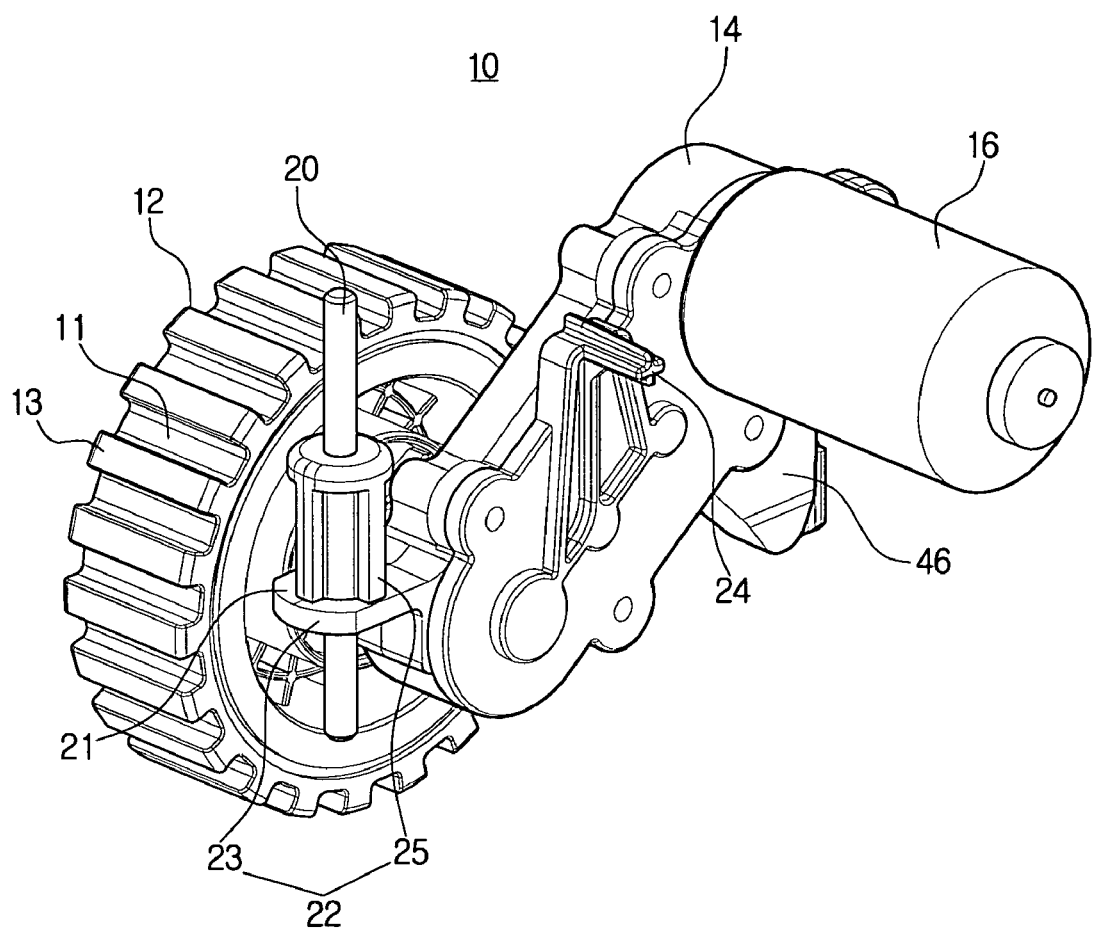
FIG. 1 is a perspective view of a wheel driving assembly of a moving apparatus according to an exemplary embodiment of the present disclosure, in which a vertically movable part moves with respect to a base member of the moving apparatus.
Figure 2:
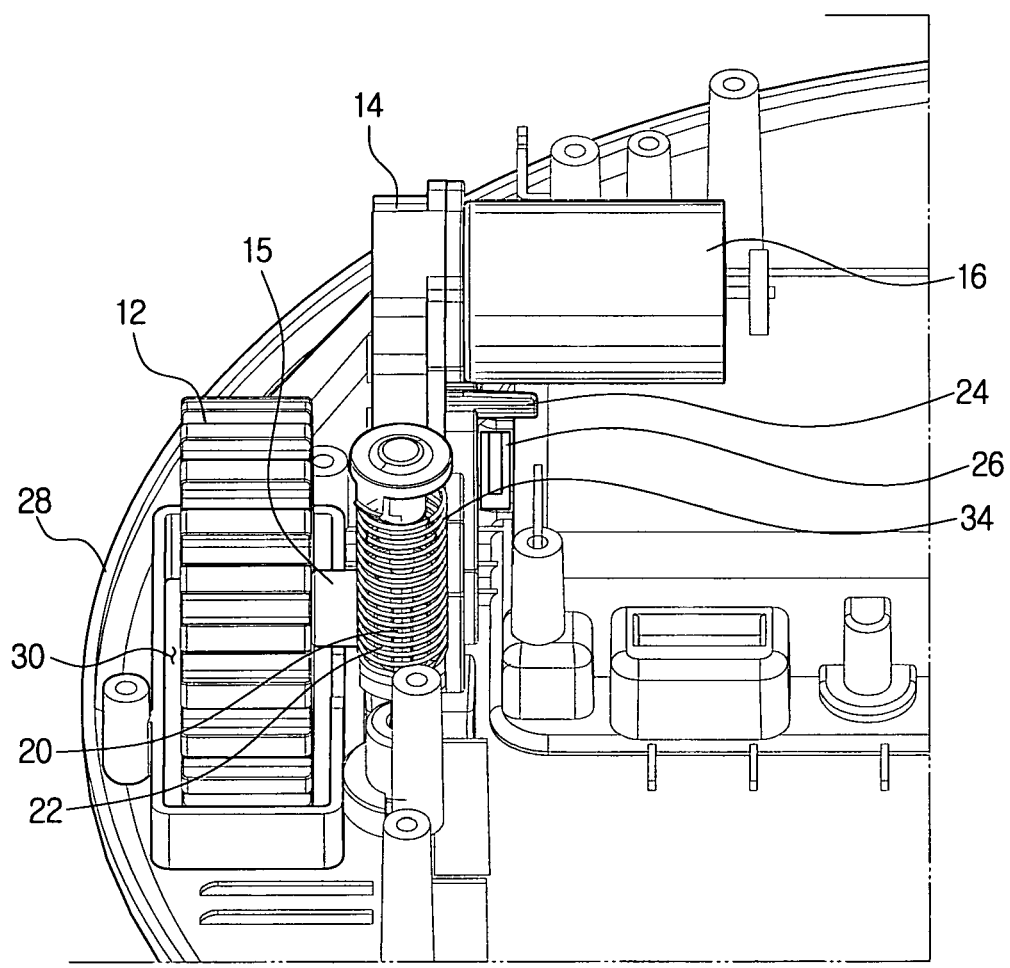
FIG. 2 is a perspective view illustrating a wheel driving apparatus mounted to a robot cleaner as one example of the moving apparatus according to an exemplary embodiment of the present disclosure.

FIG. 2 shows one side of a moving apparatus and so shows one wheel driving apparatus 10. However, two wheel driving apparatuses 10 are disposed on both sides of the moving apparatus. Referring to FIGS. 1 and 2, each of the wheel driving apparatuses 10 includes a wheel 12, a gear box 14, a driving motor 16, a guide shaft 20, a spring member 34, a touch member 24, and a switch 26.

The wheel 12 is disposed to move vertically in a wheel accommodating opening 30 formed on a base member 28 of the moving apparatus. A wheel cover 36 (FIG. 3) is fixed to the base member 28 to enclose the guide shaft 20 and the wheel 12, and the wheel 12, which is vertically movable, is disposed between the base member 28 and the wheel cover 36. The surface of the wheel 12 includes teeth 13 and valleys 11 formed thereon, and is thereby able to smoothly maneuver over bumps such as a doorsill, or to run stably without having a slippage. The wheel 12 is connected to the gear box 14 by a wheel shaft 15, and the gear box 14 is connected to the driving motor 16.

Figure 3:
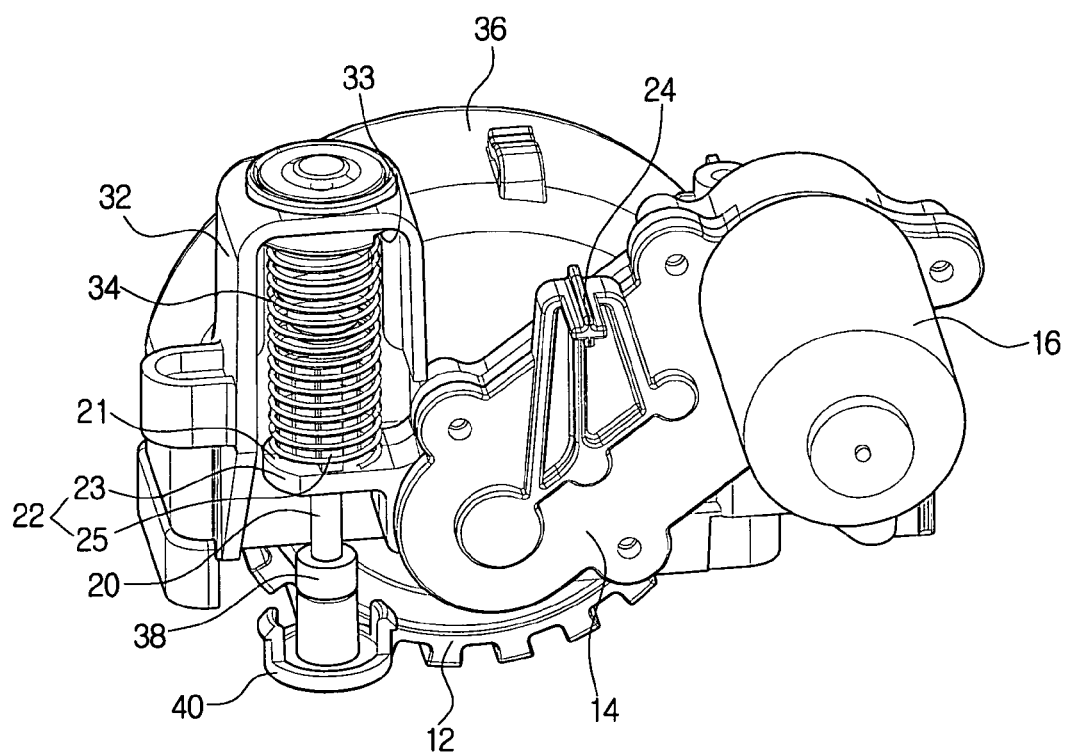
FIG. 3 is a partially cut, perspective view of a robot cleaner having a wheel driving apparatus according to an exemplary embodiment of the present disclosure, provided to explain a connection between a robot cleaner base member and a wheel cover of FIG. 2.

The driving motor 16 is implemented as a DC motor, and although not shown, the gear box 14 houses therein a train of a plurality of gears to attenuate rotational force being transmitted from the driving motor 16 and transmits the force to the wheel 12. Therefore, the reduction in rotational speed depends on the number of gears housed in the gear box 14. A supporting member 22 protrudes horizontally from one side of the gear box 14, to support the guide shaft 20. The guide shaft 20 may be implemented as a vertical bar. The supporting member 22 may include a base part 23 protruding horizontally from the outer surface of the gear box 14 and a support part 25 to enclose the guide shaft 20. The base part 23 may be implemented as a plate, having a larger area than the lower surface of the support part 25 which is connected to the upper surface of the plate. Accordingly, the base part 23 protrudes slightly further from the outer surface of the support part 25 at the contact portion between the base part 23 and the support part 25. The protruding part of the base part 23 supports the lower portion of the spring member 34 (FIG. 3). The touch member 24 protrudes horizontally from the upper portion of the gear box 14, and a sliding protrusion 46 protrudes from the opposite side to the guide shaft 20. When the touch member 24 contacts a micro switch 26 disposed on the base member 28, the driving motor 16 stops operating, and as a result, the wheel 12 stops rotating. The sliding protrusion 46 is received in a guide slot 48 (FIG. 4) formed on the base member 28 to move vertically. As a result, the vertical movement of the sliding protrusion 46 is guided along the guide slot 48.

The wheel 12, gear box 14, driving motor 16, guide shaft 20, and the support member 22 are integrally connected with each other. In other words, the supporting member 22, guide shaft 20, and gear box 14 are formed as one body, and the wheel 12 and the driving motor 16 are meshed with the gear box 14 so that the gear box 14, driving motor 16, guide shaft 20, and supporting member 22 are integrally moved upward or downward. Furthermore, the wheel driving apparatus 10 is assembled conveniently in the moving apparatus, simply by mounting the spring member 34 to the outer surface of the supporting member 22, and inserting the guide shaft 20 in the base member 28 and the wheel cover 36 which will be explained below.

Figure 4:
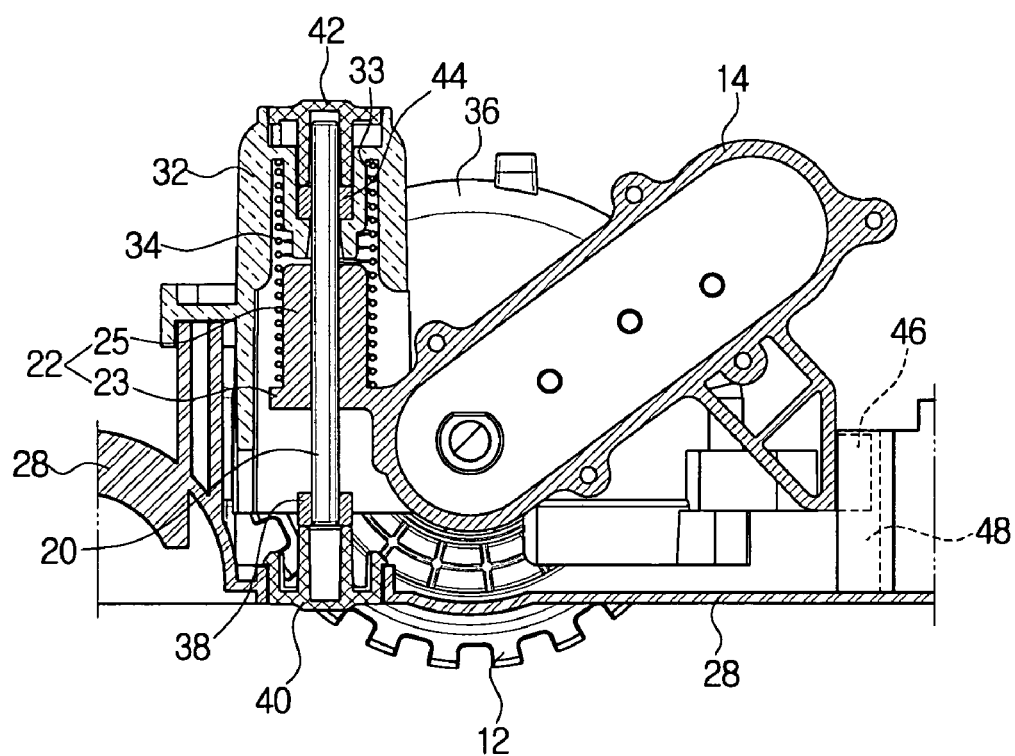
FIG. 4 is a cross-section view of FIG. 3, illustrating a wheel of a robot cleaner placed on a floor.

Referring to FIGS. 3 and 4, the spring member 34 is disposed within a protective casing portion 32 of the wheel cover 36. The lower portion of the spring member 34 is supported on the base part 23 of the supporting member 22, and the upper portion is supported on an inner upper portion 33 of the protective casing portion 32. As a result, it is no longer necessary to install a separate member on the base member 28 to support the spring member 34, because the vertical movement of the guide shaft 20 causes the spring member 34 to extend or contract to absorb shocks or vibration.

The guide shaft 20 is supported by the base member 28 and the wheel cover 36 which is connected to the base member 28, and is vertically movable. The wheel cover 36 is detachably attached to the base member 28. The base member 28 includes a lower bearing 38 and a lower bearing cover 40. An upper bearing 44 and an upper bearing cover 42 are disposed inside the protective casing portion 32 of the wheel cover 36, coaxially with the lower bearing 38. The lower portion of the guide shaft 20 is inserted in the lower bearing 38 and the lower bearing cover 40, and the upper portion of the guide shaft 20 is inserted in the upper bearing 44 and the upper bearing cover 42. The distance between the upper bearing cover 42 and the lower bearing cover 40 is set to be longer than the length of the guide shaft 20, so that the range of vertical movement of the guide shaft 20 is adjusted by adjusting the distance between the upper and lower bearing covers 42 and 40.

The interoperation of the elements of the wheel driving apparatus 10 of the moving apparatus according to an exemplary embodiment of the present disclosure will be explained below.

FIG. 4 is a cross-section view illustrating a moving apparatus moving along a plane surface, in which the wheel driving apparatus is in an ascended position with respect to the base member 28 due to its own weight.

Referring to FIG. 4, the guide shaft 20 ascends in the direction of the upper bearing 44 by insertion, and the sliding protrusion 46 is at the upper portion of the guide slot 48. The gear box 14 is disposed upwardly away from the base member 28.

Figure 5:
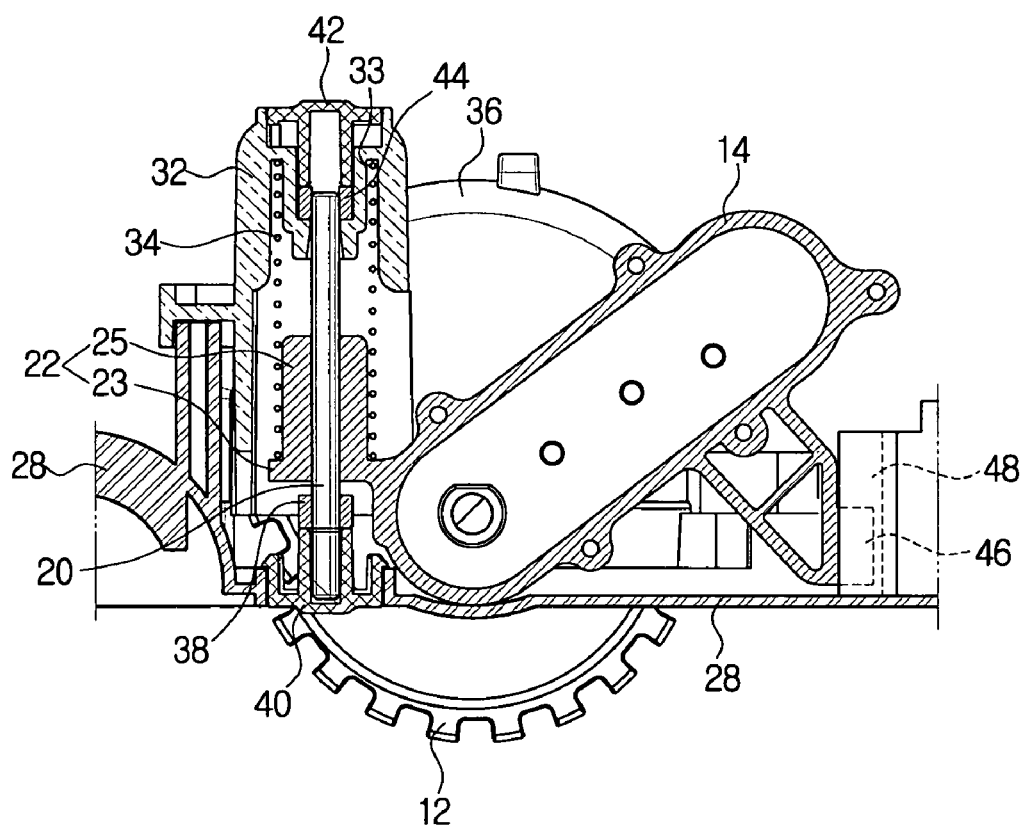
FIG. 5 is a cross-section view of FIG. 3, illustrating a wheel of a robot cleaner taken up from the floor.

When a user grips and lifts the moving apparatus while it is traveling on a planar surface, referring to FIG. 5, the wheel driving apparatus 10 disposed in the base member 28 is lowered down with respect to the base member 28. Accordingly, the wheel 12 protrudes out through the lower portion of the base member 28, the guide shaft 20 descends to nearly touch the lower surface of the lower bearing cover 40, and the sliding protrusion 46 descends to the lower portion of the guide slot 48. In this situation, the touch member 24 contacts the micro switch 26 (FIG. 2), thereby stopping the rotation of the wheel 12. This provides user safety, because otherwise, the user's hand may be hurt by the rotating wheel 12. By detecting the lifting of the moving apparatus and stopping the rotation of the wheel 12, improved safety is provided to users, especially to children, whose hands can be squeezed by the wheel accommodating opening 30 (FIG. 2).

While an automatic moving apparatus such as a robot cleaner was implemented above as an example to explain the present disclosure, one will understand that the wheel driving apparatus according to the present disclosure is applicable to any movable device that includes a driving motor and a wheel, regardless of whether the running is autonomous or by control.

While certain exemplary embodiments of the present disclosure have been shown and described with reference to certain preferred embodiments thereof, it will be understood by those skilled in the art that various changes in form and details may be made therein without departing from the spirit and scope of the invention as defined by the appended claims and their equivalents

What is claimed is:

1. A wheel driving apparatus of a moving apparatus, comprising:

a wheel;

a driving motor to generate a driving power to rotate the wheel;

a gear box to transmit the driving power of the driving motor to the wheel; and a guide shaft movable vertically with respect to a base member, wherein the wheel, the driving motor, the gear box, and the guide shaft are connected integrally with each other to move vertically with respect to the base member in unison, and wherein the guide shaft has a first end that is supported by the base member and a second end of the guide shaft that is supported on a wheel cover connected to the base member.

2. The wheel driving apparatus of claim 1, further comprising a spring member to elastically support the wheel, the driving motor, the gear box, and the guide shaft when moved in unison.

3. The wheel driving apparatus of claim 1, wherein the base member, the guide shaft, and the gear box form a module that is vertically movable.

4. The wheel driving apparatus of claim 2, further comprising a sliding protrusion that protrudes from a side of the gear box, and a guide slot to guide the movement of the sliding protrusion, wherein the sliding protrusion is vertically movable.

5. The wheel driving apparatus of claim 1, wherein the wheel cover is removably mounted on an upper portion of the base member.

6. The wheel driving apparatus of claim 5, wherein the gear box comprises a support member extending from a portion thereof to move along the guide shaft, and the spring member is disposed between the support member and the wheel cover.

7. The wheel driving apparatus of claim 6, further comprising a touch member extending from one side of the gear box to change a position according to ascending and descending movement of the gear box, and a switch disposed on the base member to correspond to the touch member, so that the driving motor stops operating when the touch member is brought into contact with the switch.

* * * * *